United States Patent
Lee et al.

(10) Patent No.: US 8,792,556 B2
(45) Date of Patent: Jul. 29, 2014

(54) SYSTEM AND METHOD FOR CORRECTING MOTION VECTORS IN BLOCK MATCHING MOTION ESTIMATION

(75) Inventors: Sangkeun Lee, Irvine, CA (US); Yeong-Taeg Kim, Irvine, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1578 days.

(21) Appl. No.: 11/765,381

(22) Filed: Jun. 19, 2007

(65) Prior Publication Data
US 2008/0317127 A1 Dec. 25, 2008

(51) Int. Cl.
*H04N 7/26* (2006.01)

(52) U.S. Cl.
USPC .................................................. 375/240.16

(58) Field of Classification Search
USPC ................................................... 375/240.16
See application file for complete search history.

(56) References Cited

U.S. PATENT DOCUMENTS

| | | | |
|---|---|---|---|
| 5,786,847 A * | 7/1998 | Katayama et al. | 348/47 |
| 6,628,711 B1 * | 9/2003 | Mathew et al. | 375/240.12 |
| 7,382,846 B1 * | 6/2008 | Zange et al. | 375/365 |
| 2004/0120401 A1 * | 6/2004 | Linzer et al. | 375/240.16 |
| 2005/0201464 A1 * | 9/2005 | Lee | 375/240.16 |
| 2006/0133498 A1 * | 6/2006 | Park et al. | 375/240.16 |
| 2006/0222077 A1 * | 10/2006 | Ohwaki et al. | 375/240.16 |
| 2007/0153908 A1 * | 7/2007 | Lin | 375/240.24 |
| 2008/0107186 A1 * | 5/2008 | Brusnitsyn et al. | 375/240.28 |

FOREIGN PATENT DOCUMENTS

KR 10-205-0092306 9/2005

* cited by examiner

*Primary Examiner* — Gilberto Barron, Jr.
*Assistant Examiner* — David Le
(74) *Attorney, Agent, or Firm* — IP Investment Law Group

(57) ABSTRACT

A system and method for processing video data is disclosed. In one embodiment, the method includes receiving a first video frame and a second video frame, where the video frames comprise a plurality of blocks of pixels. The method further includes obtaining motion vector information identifying positions of a plurality of matching blocks between the first frame and the second frame, and calculating a measure related to an angle between a first motion vector for a first block in the first frame and a second motion vector for a second block in the first frame, where the second block is located at a frame position in the first frame within a neighborhood of the frame position in the second frame identified by the first motion vector. The method further includes determining that the first and second motion vectors are conflicting based on the calculated angle measure and modifying at least one of the first motion vector and the second motion vector if the first and second motion vectors are determined to be conflicting.

20 Claims, 6 Drawing Sheets

SYSTEM AND METHOD FOR CORRECTING MOTION VECTORS IN BLOCK MATCHING MOTION ESTIMATION

BACKGROUND OF THE INVENTION

1. Field of the Invention

The invention is related to video processing. More particularly, the invention is related to correcting motion information used for reformatting of video data.

2. Description of the Related Technology

Multimedia processing systems, such as video encoders, may encode multimedia data using encoding methods based on international standards such as MPEG-x and H.26x standards. Such encoding methods generally are directed to compressing the multimedia data for transmission and/or storage. Compression is broadly the process of removing redundancy from the data. In addition, video display systems may transcode or transform multimedia data for various purposes such as, for example, to ensure compatibility with display standards such as NTSC, HDTV, or PAL, to increase frame rate in order to reduce perceived motion blur, and to achieve smooth motion portrayal of content with a frame rate that differs from that of the display device. These transcoding methods may perform similar functions as the encoding methods for performing frame rate conversion, de-interlacing, etc.

A video signal may be described in terms of a sequence of pictures, which include frames (an entire picture), or fields (e.g., an interlaced video stream comprises fields of alternating odd or even lines of a picture). A frame may be generally used to refer to a picture, a frame or a field. Multimedia processors, such as video encoders, may encode a frame by partitioning it into blocks or "macroblocks" of, for example, 16×16 pixels. The encoder may further partition each macroblock into subblocks. Each subblock may further comprise additional subblocks. For example, subblocks of a macroblock may include 16×8 and 8×16 subblocks. Subblocks of the 8×16 subblocks may include 8×8 subblocks, and so forth. Depending on context, a block may refer to either a macroblock or a subblock, or even a single pixel.

Video sequences may be received by a receiving device in a compressed format and subsequently decompressed by a decoder in the receiving device. Video sequences may also be received in an uncompressed state. In either case, the video sequence is characterized at least by a frame rate, and a horizontal and vertical pixel resolution. Many times, a display device associated with the receiving device may require a different frame rate and/or pixel resolution and video reconstruction of one or more video frames may be performed. Reconstruction of video frames may comprise estimating a video frame between two or more already received (or received and decompressed) video frames. The reconstruction may involve techniques known as motion estimation and motion compensation. Matching portions of video frames between two or more already received (or received and decompressed) frames are identified along with a motion vector that contains the relative locations of the matching blocks in the process of motion estimation. These matching blocks and motion vectors are then used to reconstruct portions of the intermediate frame by the process of motion compensation. Frame rate conversion, de-interlacing and transcoding are examples of processes where decoder devices create new video data based on already reconstructed video data. In addition, these motion compensation techniques can use encoded data, such as motion vectors and residual error, as well as the reconstructed video data for estimating the newly created frames.

Motion of objects in front of background, behind foreground, and in front of or behind other objects cause what are referred to as occlusions. Occlusions occurring in a video sequence present a problem to any motion estimation/compensation algorithm. Occlusions include, for example, the covering of one object (background is considered as an object) by another, and the uncovering of one object due to motion of another. Typically, the motion vectors estimated in the vicinity of occlusion areas are incorrect and using these motion vectors directly for motion compensation causes visual artifacts. Incorrect motion vectors used for frame rate conversion between two frames can be a particularly common cause of visual artifacts. Frame rate conversion typically uses motion vector information identifying matching blocks between two frames. These motion vectors and matching blocks are used by various motion compensation schemes to construct portions of a frame at various phase positions between the two frames. Techniques for identification and correction of incorrect motion vectors between two frames, where the motion vectors are to be used for construction of an intermediate frame, can be complex and inaccurate.

SUMMARY OF CERTAIN INVENTIVE ASPECTS

The systems and methods of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Inventive Embodiments" one will understand how the sample features of this invention provide advantages that include more robust and efficient reformatting of video sequences including incorrect motion vectors.

An aspect provides a method of processing video data. The method of this aspect includes receiving a first video frame and a second video frame, wherein the video frames comprise a plurality of blocks of pixels, obtaining motion vector information identifying positions of a plurality of matching blocks between the first frame and the second frame, calculating a measure related to an angle between a first motion vector for a first block in the first frame and a second motion vector for a second block in the first frame, where the second block is located at a frame position in the first frame within a neighborhood of the frame position in the second frame identified by the first motion vector, determining that the first and second motion vectors are conflicting based on the calculated angle measure, and modifying at least one of the first motion vector and the second motion vector if the first and second motion vectors are determined to be conflicting.

Another aspect provides a system for processing video data. The system of this aspect includes a motion estimation subsystem configured to receive a first video frame and a second video frame, wherein the video frames comprise a plurality of blocks of pixels, and the motion estimation subsystem obtains motion vector information identifying positions of a plurality of matching blocks between the first frame and the second frame, and a conflict detection subsystem configured to calculate a measure related to an angle between a first motion vector for a first block in the first frame and a second motion vector for a second block in the first frame, where the second block is located at a frame position in the first frame within a neighborhood of the frame position in the second frame identified by the first motion vector, to determine that the first and second motion vectors are conflicting based on the calculated angle measure, and to modify at least one of the first motion vector and the second motion vector if the first and second motion vectors are determined to be conflicting.

DETAILED DESCRIPTION OF CERTAIN INVENTIVE EMBODIMENTS

The following detailed description is directed to certain specific sample aspects of the invention. However, the invention can be embodied in a multitude of different ways as defined and covered by the claims. In this description, reference is made to the drawings wherein like parts are designated with like numerals throughout.

Video signals may be characterized in terms of a series of pictures, frames, or fields. As used herein, "frame" is a term that may encompass either frames or fields of a progressive video signal or frames or fields of an interlaced video signal.

Embodiments of processing video data including identifying and modifying conflicting motion vectors are described. As used here in a pair motion vectors are conflicting if one or both motion vectors reference a portion of video data that may be at least partially occluded in one frame but not the other. The processing can be performed in a video decoder, a video transcoder or a video display system. Embodiments analyzing motion vectors of matching blocks (e.g., as determined by motion estimation techniques) of video data from a first frame to a second frame, identify conflicting motion vectors, and modifying the conflicting motion vectors will be described. Methods of modifying those motion vectors determined to be conflicting prior to using the motion vectors in various video reformatting schemes will also be described.

Figure 1:
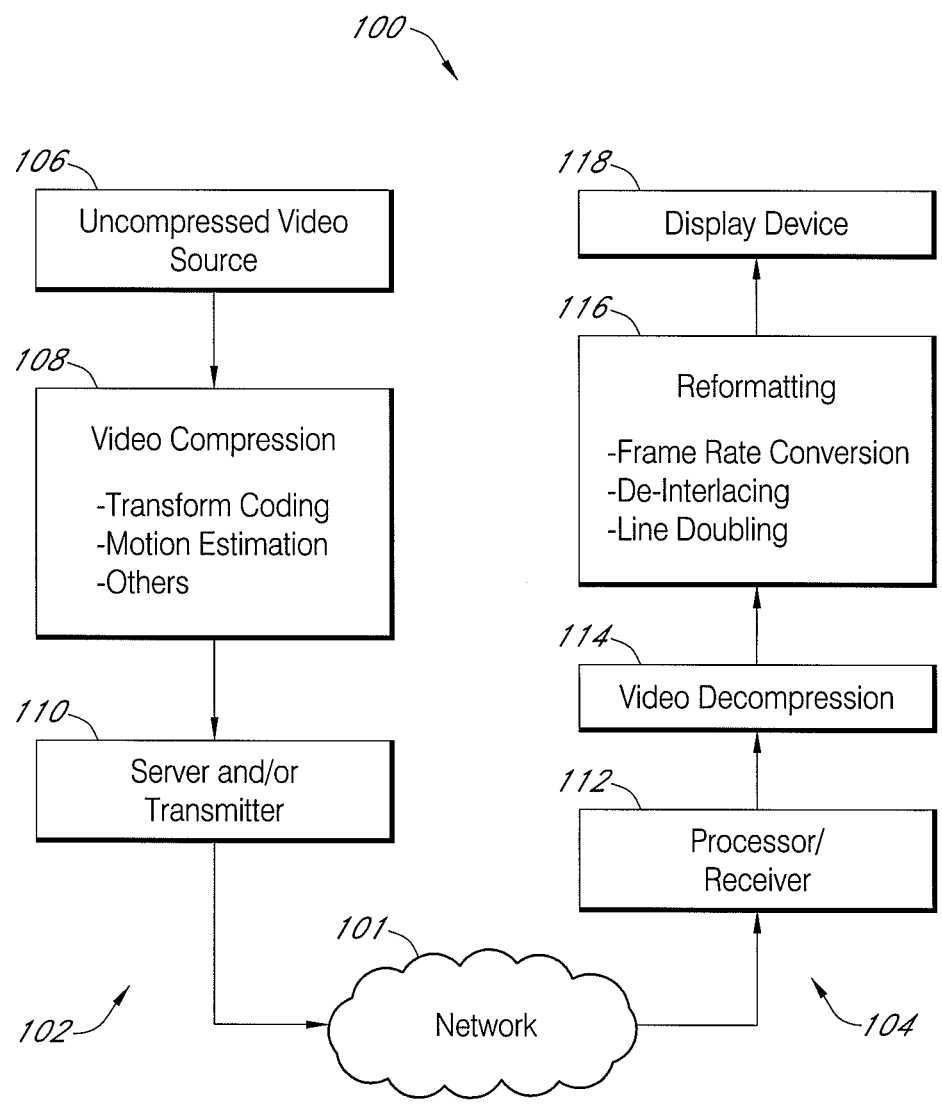
FIG. 1 is a functional block diagram of an exemplary communication system for encoding and decoding of compressed digital video data, according to one embodiment of the system and method.

FIG. 1 illustrates a functional block diagram of an exemplary communication system 100. The system 100 includes a video source 102 and video reception device 104. In this embodiment, the video source 102 obtains raw (uncompressed) video from an uncompressed video source 106, compresses it with a video compression element 108 and stores or communicates the compressed video data using a communication element 110. The video reception device 104 includes a processor and/or receiver 112, a video decompression element 114 and a reformatting subsystem 116. The compressed video can be communicated from the video source 102 to the video reception device 104 via a network 101.

The uncompressed video source 106 can be a video camera, or a memory device such as a disk drive. The uncompressed video source 106 provides uncompressed video data in the form of luminance and chrominance, or in individual color intensities such as red, green and blue, etc.

The video compression element 108 performs any of various video encoding techniques to remove the redundancy from the uncompressed video data. Transform coding may be used to remove higher spatial frequency components thereby removing spatial redundancy within a frame. Most video compression schemes involve a form of motion estimation such as block matching/motion compensated prediction or optical flow as well as others. The purpose of the motion estimation schemes is to remove the temporal redundancy between frames in a video sequence. Other forms of video compression known to skilled technologists may also be used in the video compression element 108.

The communication element 110 may be a server that is connected to the Internet and stores the compressed video. The communication element 110 may also be a transmitter that is configured to transmit the compressed video over the network 101. The network 101 may comprise one or more of a wireline or wireless communication system, including one or more of, for example, an Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a DMB (Digital Multimedia Broadcasting) system, an orthogonal frequency division multiple access (OFDM) system, or a DVB-H (Digital Video Broadcasting-Handheld) system.

The processor/receiver 112 of the video reception device 104 receives the compressed video over the network 101. In another embodiment, the processor/receiver accesses the compressed video from a memory storage device such as a DVD, a hard drive, a memory card, etc. The processor/receiver 112 can be included in a personal computer, a set top box, a handheld device, etc.

The video decompression element 114 decodes (e.g., decompresses) the received compressed video data. The video decompression element 114 reconstructs the video frames that were compressed in the encoding process. Reconstruction can include inverse transformation of transformed coefficients (e.g., discrete cosine transform (DCT), wavelet transform, etc.), reconstruction of spatially predicted data, and reconstruction of temporally predicted data. The video decompression element 114 can be part of the same device that contains the processor/receiver 112, or it can be a separate device. The video reception device 104 can be part of a set-top box, a DVD player, a PC, etc. In some embodiments, the video reception device 104 may receive uncompressed video (e.g., from the uncompressed video source 106). In these embodiments, the video decompression element 114 may be omitted.

The format of the reconstructed video output from the video decompression element 114 depends on the format that was encoded by the video encoder. For example, digital video formats can include different frame rates, different numbers of lines and rows of pixels, interlaced and non-interlaced, etc.

For example, movies are typically produced at 24 fps (frames per second) format, NTSC is 30 frames per second and PAL is 25 frames per second. The format may be interlaced or progressive. The reformatting subsystem 116 modifies the video signal to a format that fits the format of a display device 118 that is connected to the video reception device 104. The display device may be a television set (e.g., NTSC, PAL or HDTV), or a computer monitor running at frame rates such as 70 Hz, 75 Hz, 80 Hz, etc. The reformatting subsystem 116 may be part of the same device as the video decompression element 114 and/or the processor receiver 112. In some embodiments as discussed above, the video received by the video reception device 104 may be uncompressed video (e.g., from the uncompressed video source 106) and the video decompression element 114 is omitted. In these embodiments, the reformatting subsystem 116 reformats the uncompressed video.

The processes performed by the reformatting subsystem 116 can be very similar to the encoding schemes used to encode the compressed video data. Motion estimation/compensation can be used to create intermediate frames between reconstructed frames in order to enable frame rate conversion. Therefore, methods of spatial prediction and temporal prediction used in encoder devices can also be used in decoder devices for purposes of reformatting the video. The reformatting subsystem 116 can use reconstructed video data and/or compressed video data (e.g., motion vectors, residual error values, etc.) for performing the reformatting.

Figure 2:
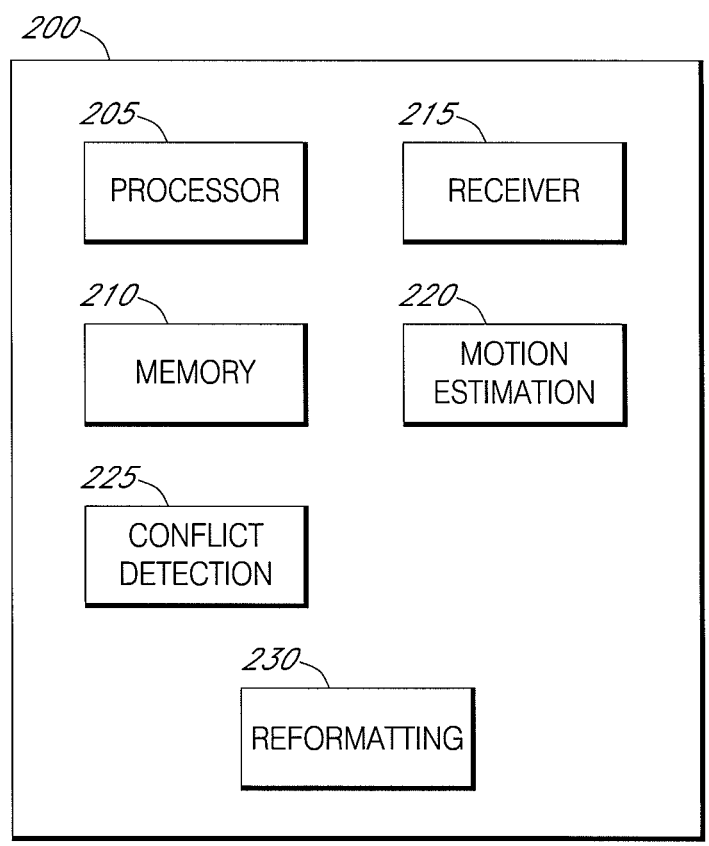
FIG. 2 is a block diagram illustrating an embodiment of a video reception system that may be used for the video reception device in a communication system such as illustrated in FIG. 1.

FIG. 2 is a block diagram illustrating an embodiment of a video reception system 200 that may be used for the video reception device 104 in a communication system such as illustrated in FIG. 1. In this embodiment, the video reception system 200 comprises a processor element 205, a memory element 210, an optional receiver element 215, a motion estimation subsystem 220, a conflict detection subsystem 225, and an optional reformatting subsystem 230. The processor 205 may include one or more of a general purpose processor and/or a digital signal processor and/or an application specific hardware processor. The memory 210 may include, for example, one or more of integrated circuits or disk based storage or any readable and writeable random access memory device. The processor 205 is coupled to the memory 210 and the other elements to perform the various actions of the other elements. In some embodiments, the receiver 215 receives video data over the network 101. In other embodiments, the other elements (e.g., the motion estimation subsystem 220) may receive the video data directly from the memory element 210 or one or more external memory devices including memory discs, memory cards, internet server memory, etc. The video data received over the network 101, from the memory element 210 or from external memory devices may be compressed or uncompressed video data. In the case of compressed video data stored in the memory element 210 or in the external memory devices, the compressed video data may have been created at an earlier time by an encoding device such as the video source 102 in FIG. 1.

The motion estimation subsystem 220 identifies portions of video that exhibit temporal redundancy from between two or more frames of video sequences as discussed above. The identified portions of video data containing temporal redundancy can be used to reconstruct new frames of video, such as done in frame rate conversion or de-interlacing. The portions of reference frames identified by the motion estimation subsystem 220 may be used by the reformatting subsystem 230, along with motion estimation data such as motion vectors either obtained from the encoded/compressed data or determined by the motion estimation subsystem 220, to construct other frames or portions of video data in reference to the reference frames. In one embodiment, a motion vector is used to locate a portion of an already reconstructed reference frame that is used to construct the portion of the other frame. In one aspect, a matching block of pixels in a second frame is identified by the motion estimation subsystem 220 for each block in a first frame. A residual error measurement such as a sum of absolute differences (SAD) or a mean square error (MSE) may be used to identify a matching reference portion or portions that may be used to construct other video frames using the reformatting subsystem 230. Details of actions performed by the motion estimation subsystem 220 will be discussed below in reference to the methods illustrated in FIG. 3.

The conflict detection subsystem 225 uses motion estimation data such as motion vectors and corresponding blocks of pixels in the first and second frames to identify reference blocks that have conflicting motion vectors that have a likelihood of resulting in visual artifacts when used for construction of other video frames by the reformatting subsystem 230. It has been found that by identifying blocks of video that are indicated to be moving passed or towards each other, as indicated by the motion vectors (encoded in received data or determined by the motion estimation subsystem 220), have a likelihood of having one or more incorrect motion vectors. Conflicting motion vectors may occur in portions of a video frame where one object is covering another object (know as an occlusion). In these situations, if the motion estimation subsystem 220 attempts to identify a matching block in a second frame for a block in a first frame, and the image of the block in the first frame is occluded in the second frame, then the motion vector will likely be incorrect. This incorrect motion vector will possibly result in conflicting motion vectors between the first and second frames and will also likely cause visual artifacts if used for reformatting. The conflict detection subsystem is configured to identify such conflicting motion vectors and modify one or more of them such that visual artifacts are less likely to occur during reformatting. Details of functions performed by the conflict detection subsystem 225 will be discussed below in reference to the methods illustrated in FIG. 3.

The reformatting subsystem 230 is used to reformat the reconstructed video data in order to display it on a video display device with certain video format requirements, e.g., frame rate, numbers of pixels per row and/or column, etc. The reformatting subsystem 230 can perform functions as discussed above in reference to the reformatting subsystem 116 of the video receiver 104. In one embodiment, the reformatting subsystem 230 creates one or more new frames between the reconstructed frames in order to match a frame rate of the display device. In one aspect, motion compensation techniques, similar to those discussed above, may be used to create the intermediate frames of frame rate conversion. The reformatting subsystem uses the modified motion vectors that were identified to be conflicting by the conflict detection subsystem and modified accordingly.

In some embodiments, one or more of the elements of the video reception system 200 of FIG. 2 may be rearranged and/or combined. The elements may be implemented by hardware, software, firmware, middleware, microcode or any combination thereof. Details of the actions performed by the elements of the video reception system 200 will be discussed in reference to the methods illustrated in FIG. 3 below.

Figure 3:
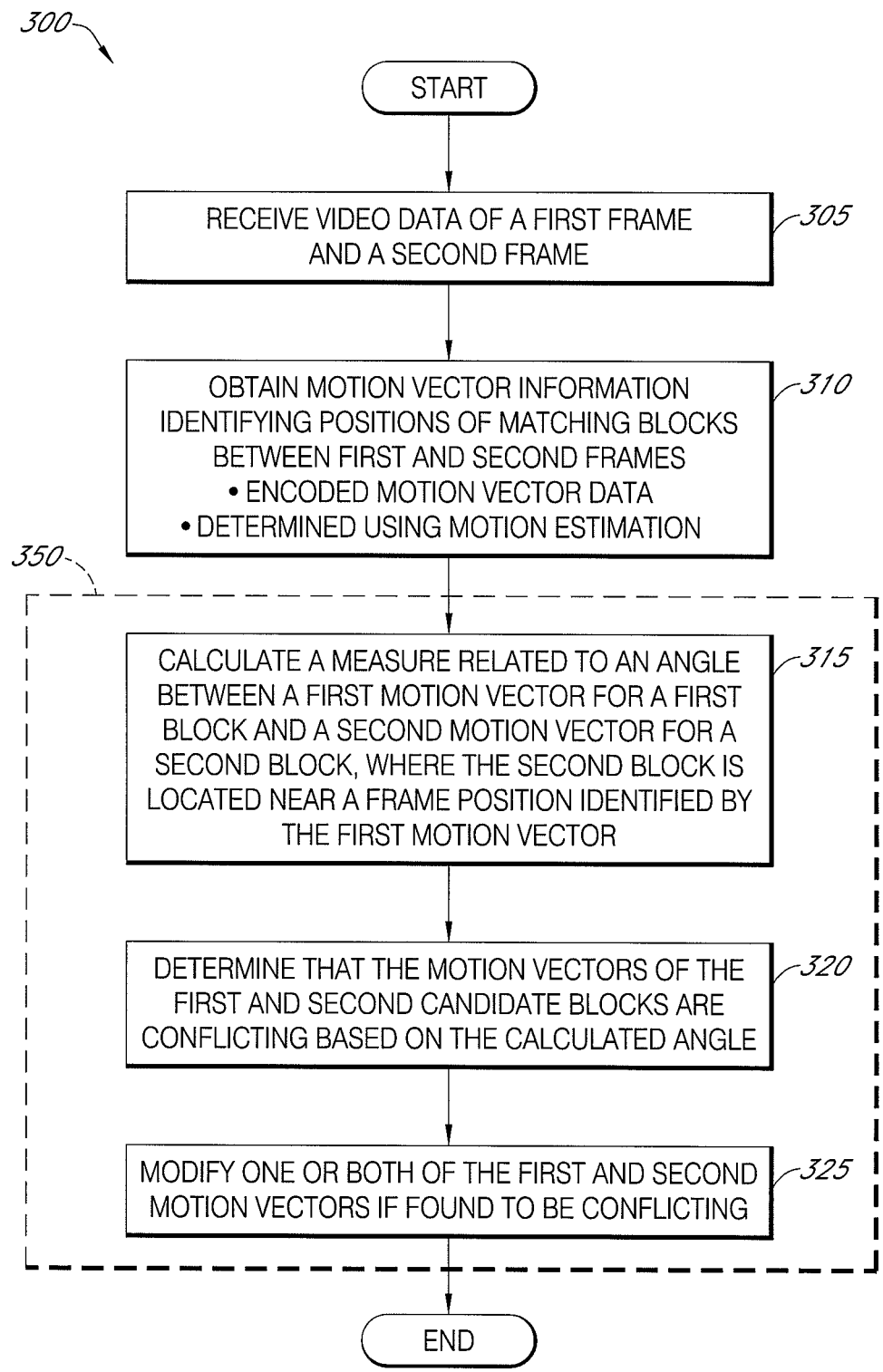
FIG. 3 is a flowchart illustrating an example of a method of detecting and correcting conflicting motion vectors in a system such as illustrated in FIG. 1.

FIG. 3 is a flowchart illustrating an example of a method of detecting and correcting conflicting motion vectors in a system such as illustrated in FIG. 1. Process 300 may be performed, for example, by a video reception device such as the video reception system 200 of FIG. 2. The process 300 identifies conflicting motion vectors between matching portions of video to be used for reformatting purposes such as frame rate conversion, de-interlacing and transcoding. The motion vectors that are identified as conflicting are modified such that they are less likely to result in visual artifacts when used for reformatting. The process 300 will be described for a scenario where a block of pixels is constructed in an intermediate frame based on video data from a previous frame and a subsequent frame. The process 300 could be used for other scenarios, this scenario is only an example. For example, a future frame could be constructed based on video data from two previous frames, or a past frame could be constructed from video data based on two subsequent frames.

The process 300 starts at block 305, where the reception device receives a first and second frame of video data. The frames of video data comprise multiple pixels which may be divided into blocks of pixels. The blocks of pixels may be of any size and shape ranging from single pixels, to 2×1 pixels, 2×2 pixels, 2×4 pixels, 4×4 pixels, 4×8 pixels, 8×8 pixels, 8×16 pixels, 16×16 pixels or other sizes. The received frames may be obtained from a variety of sources, examples of which include compressed video, uncompressed video, and encoded video. If the frames comprise compressed video, a video processing module can decompress the frames into an uncompressed format. Similarly, encoded video frames can be decoded by a relevant video processing module. The receiver element 215 of the reception system 200 in FIG. 2 can perform the functions at the block 305.

After receiving the frames of video data at the block 305, the process 300 continues at block 310, where the video reception device obtains motion vector information identifying a matching block of pixels for each block of pixels in a group of blocks in the first frame. In one aspect, where compressed video frames are received at the block 305, a current frame may be fully or partially encoded using predictive encoding from the previous frame. In this aspect, the matching blocks in the previous frame may be obtained simply by using the encoded motion vectors for each block in the current frame that is predicted from the previous frame.

For blocks that are not predicted from the previous frame (and for all blocks in cases where uncompressed video is received at the block 305), block matching may be performed at the block 310 to obtain the motion vector information. For purposes of illustration, forward block-matching motion estimation (identifying the best match for each block in the current frame n with a block from a subsequent frame n−1) is considered. However, it should be noted that backward block-matching could also be performed at the block 310.

Figure 4:
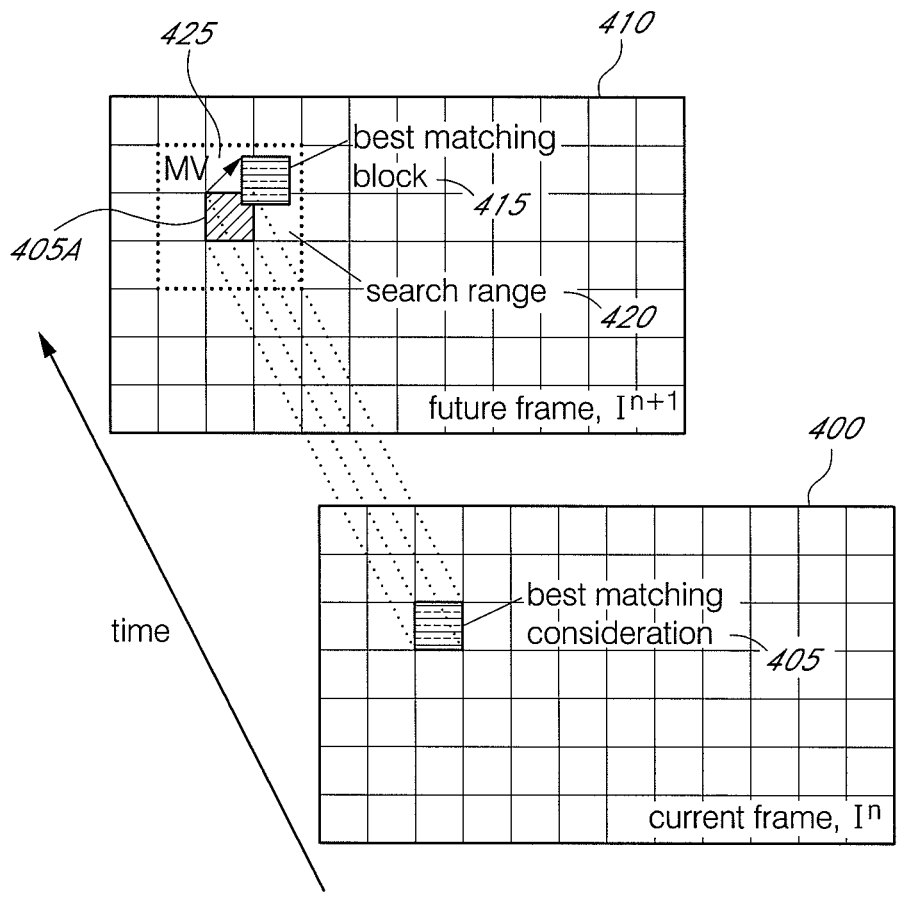
FIG. 4 is an illustration of an example of block matching that may be used in the method illustrated in FIG. 3.

FIG. 4 is an illustration of an example of block matching that may be used in the method illustrated in FIG. 3. FIG. 4 illustrates the concept of forward motion estimation. For each block 405 in the current video frame 400 (frame n), a best matching block 415 within a search area 420 in a subsequent or future video frame 410 (frame n+1) is determined. A motion vector 425, MV, indicates the position of the matching block 415 relative to the block 405 under consideration. The search area 420 may be a predetermined neighborhood of blocks surrounding a block 405A in frame 410 that is collocated (in the same vertical and horizontal location in a frame) with the block 405 of frame 400. The predetermined search area may be of any size ranging from the size of the block up to the entire frame. For blocks on the edges or corners of frames, block padding may be used. The search area may also be adaptive. A residual error measurement such as a sum of absolute differences (SAD) or a mean square error (MSE) may be used to identify a matching block. The block with the best error measurement is determined to be the matching block. The block matching at the block 310 may be performed for each block in the entire frame 400. The motion estimation subsystem 220 of the video reception system 200 in FIG. 3 can perform the functions at the block 310.

The motion vector information obtained at the block 310 may also include residual error measurements, pixel error variance, and rotational information. The motion vector information may also include more degrees of freedom other than just linear translation.

After the motion vector information is obtained at the block 320, the process 300 continues at block 315 where the video reception system calculates a measure related to an angle between a first motion vector for a first block and a second motion vector for a second block, where the second block is located near a frame position identified by the first motion vector. This measure related to the angle between the first and second motion vectors is used to identify relative motions, e.g., as identified by motion estimation methods, between first and second blocks in moving from the first frame to the second frame or vice versa. If the angle indicates that the first and second blocks are moving towards each other between the first and second, this is an indication that the motion vectors may be conflicting.

Figure 5:
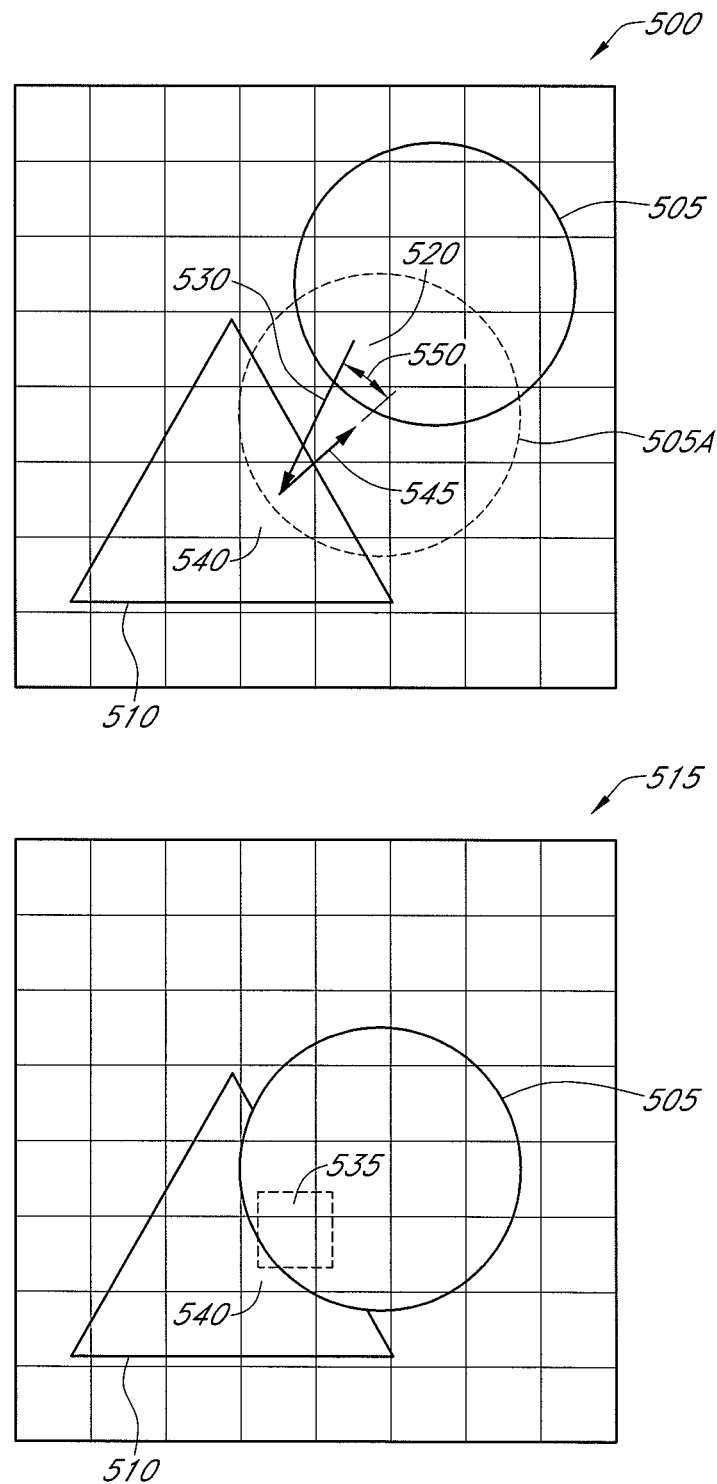
FIG. 5 is an illustration of an example of a video sequence in which conflicting motion vectors may be detected and corrected using the method illustrated in FIG. 3.

An example will be used to illustrate the methodology used at the block 315 for calculating the measure related to the angle between the first and second motion vectors. FIG. 5 is an illustration of an example of a video sequence in which conflicting motion vectors may be detected and corrected using the method illustrated in FIG. 3. A current frame 500 contains two objects including a circle 505 and a triangle 510. In a future frame 515, the circle 505 has moved relative to the triangle 510 such that the circle 505 covers a portion of the triangle 510. For illustrative purposes, a dashed image 505A of the circle 505 appears in frame 500 showing its location in frame 515.

A first block 520 in the first frame 500 has a motion vector 530 that identifies a matching block 535 (shown as an offset dashed block) in the second frame 515. The matching block 535 is offset from the other blocks in the frame 515. However, the block 535 overlaps block 540 more than the other blocks and the block 540 will be considered the nearest or most overlapped block. In other words, the block 540 in the first frame 500 is located substantially at the same frame position as the matching block 535 in the second frame 515 as identified by the first motion vector 530. The collocated block 540 in the first frame 500 has a motion vector 545 identifying its matching block (not-shown) in the second frame 515. The first motion vector 530 and the second motion vector 545 have an angle 550 between them. The angle measure calculated at the block 315 in the process 300 indicates the magnitude of the angle 550. The measure related to the angle 550 between the first motion vector 530 and the second motion vector 545 may be computed using an arc-tangent function or any other method known to skilled technologists.

The block 540 in the first frame 500 is located in a portion of the triangle 510 that is mostly covered up in the second frame 515 by the circle 505. For this reason, the motion vector 545, that was estimated using forward block matching techniques, incorrectly points to a portion within the circle 510. This is an example of an incorrect motion vector that can be identified to be conflicting by the process 300.

After the measure related to the angle between the first and second motion vectors is calculated at the block 315, the process 300 continues at block 320 where it is determined if the first and second motion vectors of the first and second blocks are conflicting based on the calculated angle measure.

It has been found that angles in a range from about 120-240 degrees may indicate that the motion vectors are conflicting. However, the range of angle that is determined to be conflicting may be other ranges including, for example, from about 125-235, 130-230, 135-225, 140-220, 145-215, 150-210, 155-205, or 160-200 degrees. Other ranges may also be used. If the angle between the first and second motion vectors is outside of one of these ranges, it is an indication that an occlusion condition is unlikely and the motion vectors are not likely to be conflicting.

If a pair of motion vectors is determined to be conflicting at the block 320, the process continues at block 325, where one or both of the motion vectors is modified. The modification may be a reduction in magnitude of both of the motion vectors. The reduction in magnitude may be implemented by multiplying or dividing the magnitude of at least one of the first or second motion vectors by a predetermined factor. The predetermined factor may be a multiplicative factor in a range from about 1/1.1 to 1/2.0. In some embodiments the motion vector information determined or obtained at the block 310 may include a residual error measure related to pixel values between the matching blocks identified by the first and second motion vectors. In these embodiments, modifying the first or second motion vectors may comprise reducing the magnitude of the first or second motion vectors in proportion to the residual error measure. A larger residual error may be an indication that a motion vector has a higher likelihood of being incorrect and therefore can be safely reduced by a larger amount. A smaller residual error may be an indication that a motion vector has a lower likelihood of being incorrect and therefore it may be desirable to reduced its magnitude by a smaller amount or not at all.

The blocks 315, 320 and 325 of the process 300 are part of a collective block 350 referred to as the conflict detection block 350. The functions of the conflict detection block 350 may be performed by the conflict detection subsystem 225 of the video reception system 200 in FIG. 3. In the example discussed above in reference to FIG. 5, the conflict detection block 350 was performed for a single second block located at substantially the same frame location as the matching block of the first block. In some embodiments, the functions of the conflict detection block 350 may be performed for multiple second blocks in a neighborhood of the matching block of the first block. Such a neighborhood may be any blocks overlapped by the matching block (this could be one, two or four blocks), a 3×3 group of blocks including the most overlapped block and any blocks surrounding it (blocks on frame edges may include few than a 3×3 group), or larger groups of blocks.

The example discussed above used forward block matching to identify the matching blocks. In another aspect, the matching blocks determined at the block 310 in the process 300 could be predicted in the current frame from a previous frame using backward block matching. In this aspect the motion vectors would point from the current frame to the subsequent frame. If this backward block matching is used, the same criteria for determining conflicting motion vectors at the block 320 may be used. It should be noted that some of the blocks of the process 300 may be combined, omitted, rearranged or any combination thereof.

Even after performing the functions of the conflict detection block 350, there may still be conflicting motion vectors. As long as conflicting motion vectors are present, there is likelihood that visual artifacts may be introduced by reformatting schemes using the conflicting motion vectors. Therefore, it may be desirable to repeat the functions of the conflict detection block 350 using the modified motion vectors in order to identify and correct motion vectors that are still conflicting. Use of such an iterative conflict process in combination with a video reformatting process will now be discussed.

Figure 6:
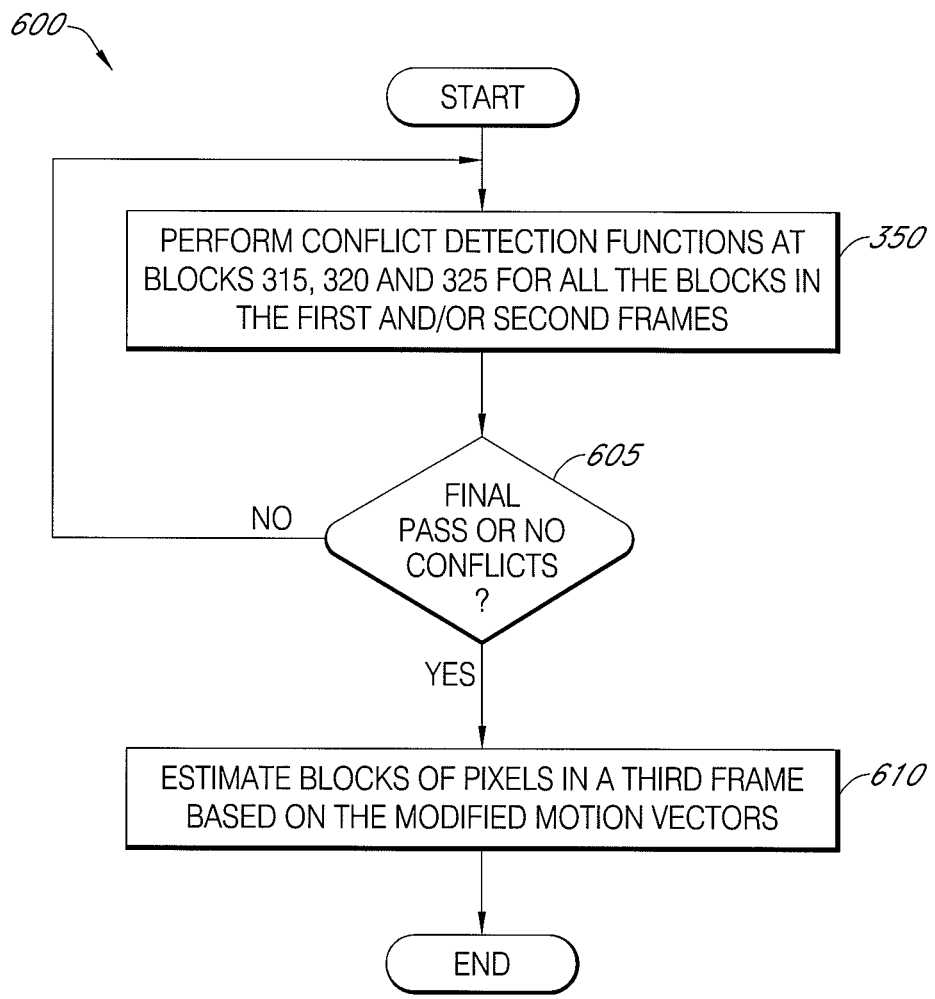
FIG. 6 is a flowchart illustrating an example of a method for reformatting video utilizing the conflicting motion vector detection and correction method of FIG. 3.

FIG. 6 is a flowchart illustrating an example of a method for reformatting video utilizing the motion vector detection and correction method of FIG. 3. Process 600 starts with performing the functions of the conflict detection block 350 which were discussed above in reference to the blocks 315, 320 and 325 in the process 300. In this embodiment, the functions of the conflict detection block 350 are performed for each of the blocks in the first and/or second frames. In other embodiments, the functions of the conflict detection block 350 may be performed on a subset of the blocks.

After the functions of the conflict detection block 350 are completed, the process 600 continues to decision block 605 where it is determined if another conflict detection iteration is needed. As discussed above, even after modifying the conflicting motion vectors, conflicts may still exist. Additional passes through the block 350 can resolve remaining conflicts. In some embodiments, there may be a fixed number of passes through the block 350 (e.g., 2, 3, 4 or more). In these embodiments the process 600 will continue back to the block 350 from decision block 605 until the final pass is completed. In some embodiments the process 600 continues to pass back through the block 350 until no conflicts are identified. In some embodiments, the process 600 may loop back to the block 350 until the number of conflicts is below a threshold percentage or number (not shown).

When the process 600 loops back to the block 350, the motion vectors that were modified in the previous pass are used. In this way, the modification (e.g., a fixed reduction in magnitude) can be applied a number of times until the conflict is corrected or until the maximum number of passes is reached. As discussed above, a fixed multiplicative reduction factor can be used to modify the conflicting vectors in the block 325. A smaller reduction factor (e.g., 1/1.1) may result in more loops back through the block 350, thus possibly increasing the computational complexity. A larger reduction factor (e.g., 1/2.0) may result in fewer loops back, but may reduce motion vectors more than desired.

As described above the first pass through the block 350 includes calculating a measure related to an angle between a first motion vector for a first block in the first frame and a second motion vector for a second block in the first frame, where the second block is located at a frame position in the first frame within a neighborhood of the frame position in the second frame identified by the first motion vector at block 315. The first pass further includes determining that the first and second motion vectors are conflicting based on the calculated angle measure at block 320, and modifying at least one of the first motion vector and the second motion vector if the first and second motion vectors are determined to be conflicting. Assuming at least the magnitude of the first motion vector was reduced in the first pass (the magnitude of the second motion vector may also be reduced), the second pass through the block 350 includes calculating the measure related to the angle between the reduced magnitude first motion vector and a third motion vector for a third block in the first frame, where the third block is located at a frame position in the first frame within a neighborhood of the frame position in the second frame identified by the reduced magnitude first motion vector. The second pass further includes determining that the reduced magnitude first motion vector and the third motion vector are conflicting based on the calculated angle measure, and modifying the reduced magnitude first motion vector or the third motion vector if determined to be conflicting.

If no conflicts were identified in the block 350, then the process 600 continues to the block 610 where blocks of pixels in a third frame are estimated based on the modified motion vectors. The third frame may be an intermediate frame between the first and second frames. The blocks of pixels in the third frame may be estimated based on any of several known motion compensation techniques. The motion compensation techniques may use data from the first and/or second frames, the data including pixel values such as luma and chroma etc. Other data, such as residual error values, may be used by the motion compensation techniques. The modified motion vectors may be scaled or interpolated to point to the third frame based on the temporal location of the third frame compared to the first and second frames. The reformatting subsystem 230 of the reception system 200 in FIG. 3 may perform the functions of the block 610. It should be noted that some of the blocks of the process 600 may be combined, omitted, rearranged or any combination thereof.

Another embodiment is a system for processing video data. The system includes means for receiving a first video frame and a second video frame, wherein the video frames comprise a plurality of blocks of pixels, means for obtaining motion vector information identifying positions of a plurality of matching blocks between the first frame and the second frame, and means for calculating a measure related to an angle between a first motion vector for a first block in the first frame and a second motion vector for a second block in the first frame, where the second block is located at a frame position in the first frame within a neighborhood of the frame position in the second frame identified by the first motion vector. The system further includes means for determining that the first and second motion vectors are conflicting based on the calculated angle measure, and means for modifying at least one of the first motion vector and the second motion vector if the first and second motion vectors are determined to be conflicting. With reference to FIG. 2, aspects of this embodiment include where the means for receiving is the receiver 215, where the means for obtaining the motion vector information is the motion estimation subsystem 220, where the means for calculating is the conflict detection subsystem 225, where the means for determining is the conflict detection subsystem 225 and where the means for modifying is the conflict detection subsystem 225.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of processing video data, comprising:
receiving a first video frame and a second video frame, wherein the video frames comprise a plurality of blocks of pixels;
obtaining motion vector information identifying positions of a plurality of matching blocks between the first frame and the second frame including:
a first motion vector for a first block in the first frame, and
a second motion vector for a second block in the first frame, where the second block is located at a frame position in the first frame within a neighborhood of the frame position in the second frame, with the frame position identified by the first motion vector;
calculating an angle measure between the first motion vector and the second motion vector;
determining the first and second motion vectors are conflicting when the angle measure is in a range from about 120 degrees to about 240 degrees; and
modifying at least one of the first motion vector and the second motion vector when the first and second motion vectors are determined to be conflicting.

2. The method of claim 1, wherein the obtained motion vector information comprises motion vectors encoded in the received first or second video frames.

3. The method of claim 1, wherein obtaining the motion vector information comprises determining the matching blocks and the motion vector information by minimizing a residual error measure between blocks in the first and the second frames.

4. The method of claim 1, wherein the second block of pixels in the first frame is located substantially at the same frame position as the matching block in the second frame identified by the first motion vector.

5. The method of claim 1, further comprising estimating a block of pixels in a third video frame using motion compensation techniques based on the modified motion vectors.

6. The method of claim 1, wherein modifying comprises multiplying or dividing the magnitude of at least one of the first or second motion vectors by a predetermined factor.

7. The method of claim 6, wherein multiplying or dividing includes multiplying or dividing by the predetermined factor in a range from about 1/1.1 to 1/2.0.

8. The method of claim 1, further comprising:
calculating the angle measure between the motion vectors obtained for one or more third blocks in the first frame and the first motion vector, wherein the third blocks are located in the neighborhood of the frame position in the second frame identified by the first motion vector;
determining the motion vectors of the first and third blocks are conflicting based on the angle measure; and
modifying the motion vector of one or more of the third blocks when the first and third motion vectors are determined to be conflicting.

9. The method of claim 1, wherein:
modifying comprises reducing the magnitude of the first motion vector;
further comprising:
calculating the angle measure between the reduced magnitude first motion vector and a third motion vector for a third block in the first frame, where the third block is located at a frame position in the first frame within a neighborhood of the frame position in the second frame identified by the reduced magnitude first motion vector;
determining the reduced magnitude first motion vector and the third motion vector are conflicting based on the angle measure; and
modifying the reduced magnitude first motion vector or the third motion vector when determined to be conflicting.

10. The method of claim 1, further comprising:
determining a residual error measure related to pixel values between the matching blocks identified by at least one of the first and second motion vectors; and
modifying the first or second motion vectors by reducing the magnitude of the first or second motion vectors in proportion to the residual error measure.

11. A method of processing video data, comprising:
receiving a first video frame and a second video frame, wherein the video frames comprise a plurality of blocks of pixels;
obtaining motion vector information identifying positions of a plurality of matching blocks between the first frame and the second frame including:
a first motion vector for a first block in the first frame, and
a second motion vector for a second block in the first frame, where the second block is located at a frame position in the first frame within a neighborhood of the frame position in the second frame, with the frame position identified by the first motion vector;
calculating an angle measure between the first motion vector and the second motion vector;
identifying relative motions between the first block and the second block;
determining the first and second motion vectors are conflicting when the angle measure is in a range from about 120 degrees to about 240 degrees and the relative motions between the first block and the second block are towards each other; and
modifying at least one of the first motion vector and the second motion vector when the first and second motion vectors are determined to be conflicting.

12. The method of claim 11, wherein the obtained motion vector information comprises motion vectors encoded in the received first or second video frames.

13. The method of claim 11, wherein obtaining the motion vector information comprises determining the matching blocks and the motion vector information by minimizing a residual error measure between blocks in the first and the second frames.

14. The method of claim 11, wherein the second block of pixels in the first frame is located substantially at the same frame position as the matching block in the second frame identified by the first motion vector.

15. The method of claim 11, further comprising estimating a block of pixels in a third video frame using motion compensation techniques based on the modified motion vectors.

16. The method of claim 11, wherein modifying comprises multiplying or dividing the magnitude of at least one of the first or second motion vectors by a predetermined factor.

17. The method of claim 16, wherein multiplying or dividing includes multiplying or dividing by the predetermined factor in a range from about 1/1.1 to 1/2.0 and is multiplicative.

18. The method of claim 11, further comprising:
calculating the angle measure between the motion vectors obtained for one or more third blocks in the first frame and the first motion vector, wherein the third blocks are located in the neighborhood of the frame position in the second frame identified by the first motion vector;
determining the motion vectors of the first and third blocks are conflicting based on the angle measure; and
modifying the motion vector of one or more of the third blocks when the first and third motion vectors are determined to be conflicting.

19. The method of claim 11, wherein:
modifying comprises reducing the magnitude of the first motion vector;
further comprising:
calculating the angle measure between the reduced magnitude first motion vector and a third motion vector for a third block in the first frame, where the third block is located at a frame position in the first frame within a neighborhood of the frame position in the second frame identified by the reduced magnitude first motion vector;
determining the reduced magnitude first motion vector and the third motion vector are conflicting based on the angle measure; and
modifying the reduced magnitude first motion vector or the third motion vector when determined to be conflicting.

20. The method of claim 11, further comprising:
determining a residual error measure related to pixel values between the matching blocks identified by at least one of the first and second motion vectors; and
modifying the first or second motion vectors by reducing the magnitude of the first or second motion vectors in proportion to the residual error measure.

* * * * *